United States Patent [19]

Terada et al.

[11] Patent Number: 4,948,189

[45] Date of Patent: Aug. 14, 1990

[54] SEAT SLIDE ASSEMBLY

[75] Inventors: Takami Terada, Toyota; Saburo Suzuki, Tokoname; Sadao Ito, Toyoake; Masayuki Yamazaki, Himi, all of Japan

[73] Assignee: Aisin Seiki Kabushiki Kaisha, Aichi, Japan

[21] Appl. No.: 327,496

[22] Filed: Mar. 23, 1989

[30] Foreign Application Priority Data

Mar. 24, 1988 [JP] Japan .................. 63-038971[U]

[51] Int. Cl.5 ............................................. B60N 2/06
[52] U.S. Cl. .................................... 296/65.1; 248/429
[58] Field of Search ............... 296/65.1; 248/429, 430; 411/85, 81, 104, 171

[56] References Cited

U.S. PATENT DOCUMENTS

| | | | |
|---|---|---|---|
| 1,820,064 | 8/1931 | Green | 411/103 X |
| 2,335,593 | 11/1943 | Howe | 411/171 X |
| 2,780,501 | 2/1957 | Rosenberg | 248/430 X |
| 4,487,459 | 12/1984 | Rees | 296/65.1 |
| 4,685,716 | 8/1987 | Kondo | 248/429 X |
| 4,809,939 | 3/1989 | Matsushima et al. | 248/430 |
| 4,830,531 | 5/1989 | Condit et al. | 411/104 |

FOREIGN PATENT DOCUMENTS 0905373 9/1962 United Kingdom ............ 248/430

*Primary Examiner*—Margaret A. Focarino
*Assistant Examiner*—Gary C. Hoge
*Attorney, Agent, or Firm*—Finnegan, Henderson, Farabow, Garrett & Dunner

[57] ABSTRACT

A seat slide assembly includes a rail mechanism for slidably supporting a seat on a floor fixedly connected to the floor, an actuating means fixed connected to the rail mechanism through a bracket for actuating the rail mechanism, a bolt member fixed to the rail mechanism by welding and supporting on the bracket, a nut member for fixing the rail mechanism to the bracket by screwing with the bolt member, a groove formed on the nut member, a flange portion formed on the rail mechanism for supporting the nut member, and a projecting portion formed on the flange portion and fixedly inserted into the groove.

6 Claims, 3 Drawing Sheets

SEAT SLIDE ASSEMBLY

BACKGROUND OF THE INVENTION

1. Field of the Invention

This invention relates to a seat slide assembly for slidably supporting a seat on a floor and more particularly to a seat slide assembly provided with a fixing means for fixing an actuating means actuating a rail mechanism to the same via a bracket.

2. Description of the Related Art

In a conventional seat slide assembly of this type, a seat is slidably supported on a floor. An actuating means is fixed to a rail mechanism 1 for actuating the same via a bracket 2, which is fixedly connected to the rail mechanism 1 by a nut 3, which in turn is welded to a lower surface of the rail mechanism 1. A bolt 4 is supported on the bracket 2 through a screw connection therebetween as shown in FIGS. 8, 9.

However, the nut 3 is fixedly connected to the rail mechanism 1 only by welding in the abovementioned conventional seat slide assembly, so that when the separating load is applied to the nut 3 by an outer force acting on the bracket 2, and the rotational force generated at the tightening state of the bolt 4, the separating strength entirely depends on the strength of the welded portion. In the case that the strength is decreased by aging of the welded portion, the separating strength is decreased accordingly. As a result, it is possible that the nut 3 may be separated from rail mechanism 1 by the separating load.

SUMMARY OF THE INVENTION

It is therefore an object of the present invention to provide a seat slide assembly in which drawbacks in the abovementioned conventional seat slide assembly can be eliminated.

Another object of the present invention is to provide a seat slide assembly in which the decrease of the separating strength is reduced to a minimum.

According to the present invention, the above and other objects can be accomplished by a seat slide assembly having a groove formed on a nut member, a downwardly depending flange portion formed on a rail mechanism for supporting to the nut member, and a projecting portion formed on the flange portion for fixedly inserting into the grove.

Thus, according to the present invention, the separating load generated by an outer forced acting on a bracket and the rotational force at the tightening state of the bolt is divided between the welded portion and the connection of the groove and the projecting portion, so that the decrease of the separating strength can be reduced to the minimum, even if the strength of the welded portion is decreased by age.

The above and other objects and features of the present invention will become apparent from the following description of preferred embodiments of the present invention with reference to the accompanying drawings.

DESCRIPTION OF THE PREFERRED EMBODIMENTS

Figure 1:
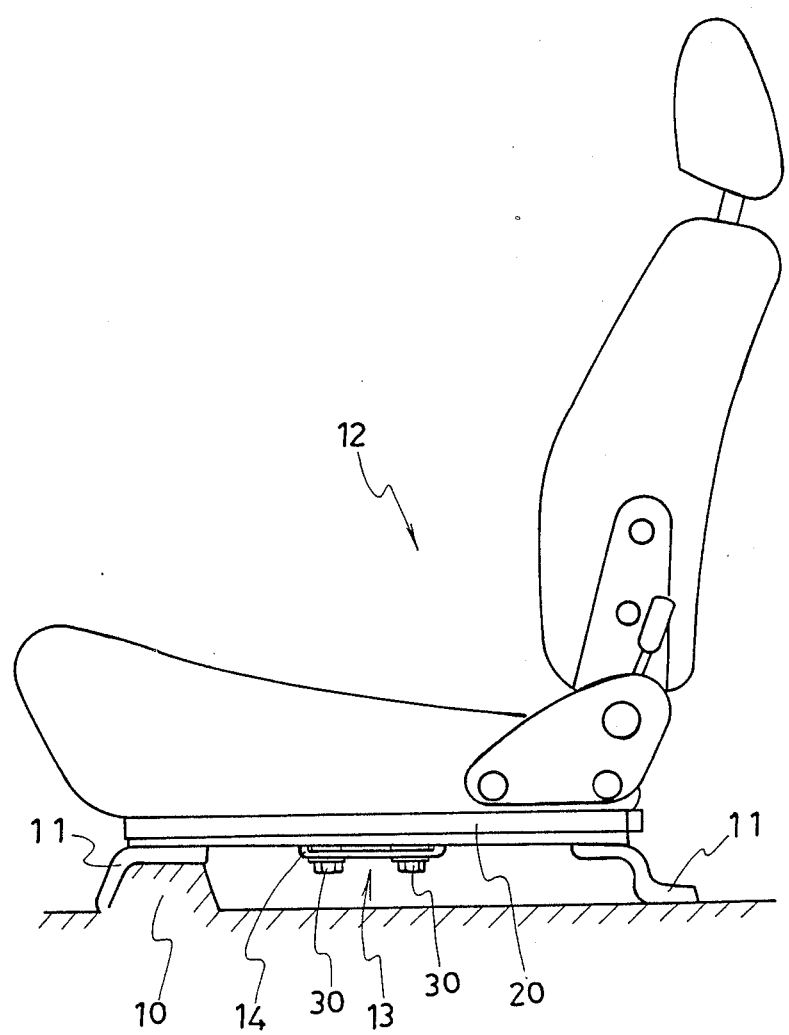
FIG. 1 is a lateral view showing a seat slide assembly attached to a seat.

Referring to FIG. 1, a rail mechanism 20 is fixedly connected to a floor 10 for slidably supporting a seat 12 through a bracket 11. An actuating means 13 is fixed to the rail mechanism 20 for forwardly and rearwardly sliding the rail mechanism.

Figure 2:
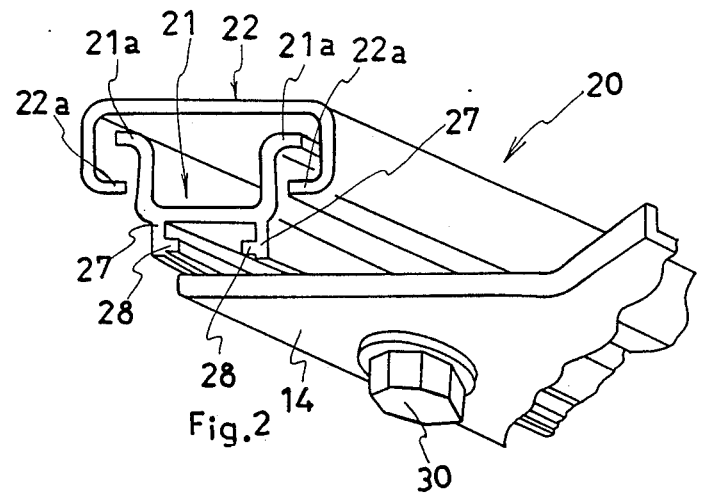
FIG. 2 is a perspective view of a seat slide assembly according to the present invention.
Figure 3:
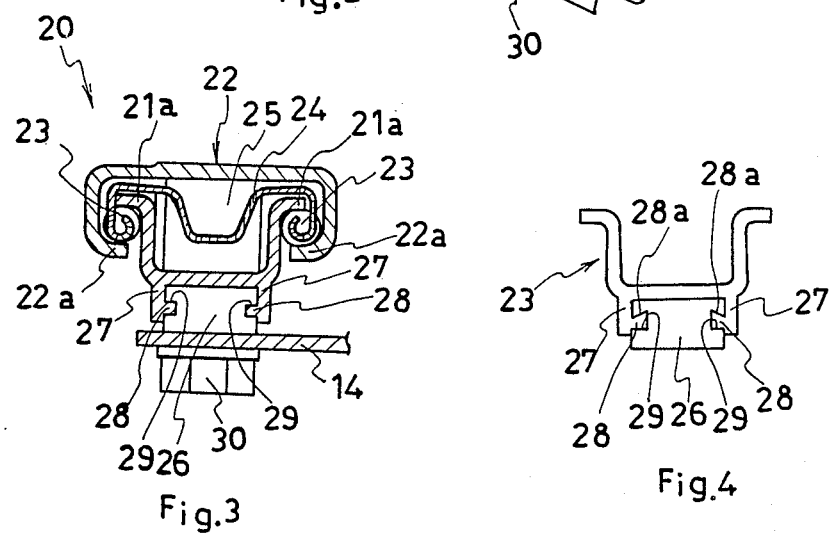
FIG. 3 is a cross-sectional view of the seat slide assembly depicted in FIG. 2.

Referring to FIG. 2, the rail mechanism 20 includes a lower rail 21 and an upper rail 22, which is slidably supported on the lower rail 21 and on which a seat is fixedly connected (not shown). The lower rail 21 has a substantially U-shaped configuration and is provided with a flange portion 21a at both ends thereof. The upper rail 22 has a substantially reverse U-shaped configuration and is provided with a flange portion 22a at both ends thereof. The flange portion 22a of the upper rail 22 is engaged with the flange portion 21 of the lower rail 21 through a ball member 23, so that the upper rail 22 is slidably supported by the lower rail 21 and a roller 25 connected to the ball 23 through a guide member 24 located in an inner space between both rails 21, 22.

Figure 4:
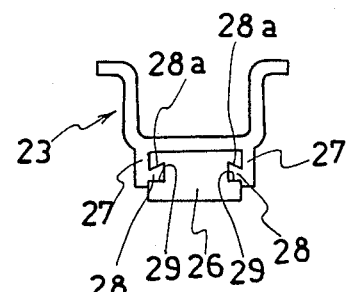
FIGS. 4-7 are cross-sectional views showing additional embodiments of the present invention.
Figure 5:
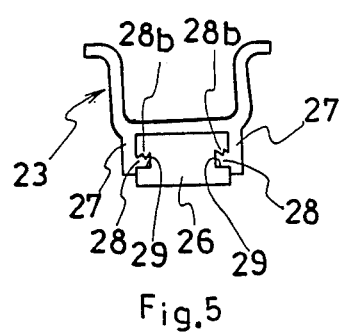
Figure 6:
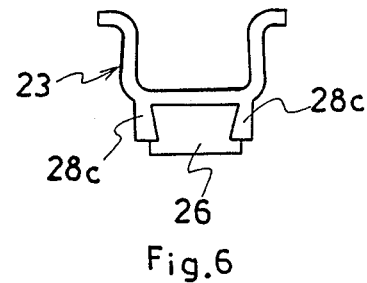
Figure 7:
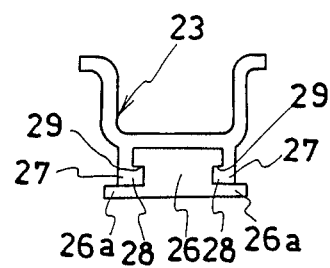
Figure 8:
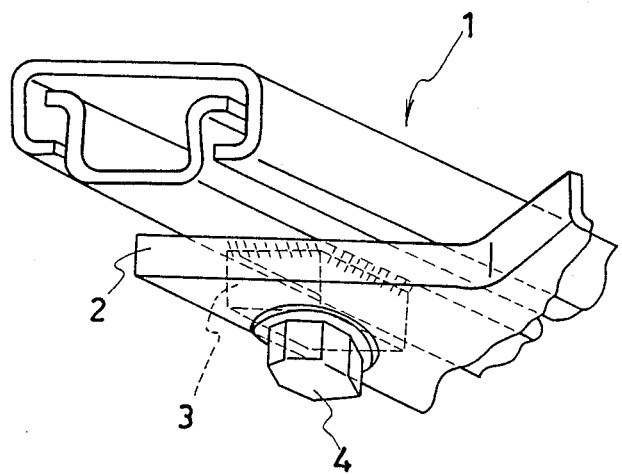
FIG. 8 is a perspective view of a conventional seat slide assembly.
Figure 9:
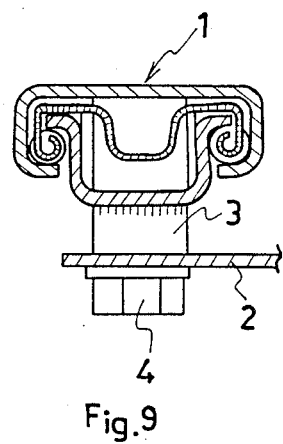
FIG. 9 is a cross-sectional view of a conventional seat slide assembly.

Two flanges 27 are formed at a lower surface of the lower rail 21 so as to squeeze the nut member 26 by contacting with a peripheral surface of the nut member 26, respectively. The flanges 27 are provided with projecting portions 28 inwardly projected therefrom, respectively. The projecting portions 28 are fixedly engaged with a groove in the peripheral surface of the nut 26, respectively, which is welded at a top end portion to the flange portion 27. A bolt member 30 supported by a bracket 14 is screwed with the nut member 26 and an actuating means 13 (see FIG. 1) is fixed to the lower rail 21 via the bracket 14. Examples of the configurations of the projecting portions 28 are shown in FIGS. 4-6. For example, FIG. 4 shows tapered surfaces 28a, while FIG. 5 demonstrates serrated portions 28b. Projecting portions 28c are shown in FIG. 6, in which the projecting portions 28 are integrally formed with the flange portions 27 which is downwardly inclined. In FIG. 7, extending portions 26a outwardly extended from the peripheral surface of the nut member 26 are provided in order to further firmly fix the nut member 26 on the lower rail 22 and are contacted with a top end of the flange portion 27 so to fixedly insert the projecting portion 28 into the groove 29. It is also possible to provide a plurality of projecting portions, the invention not being restricted to one projecting portion at both sides thereof.

As abovementioned, the nut member 26 is fixed to the lower rail 21 by welding the top end of the flange portion 27 and the nut member 26, and fixed insertion of the projecting portion 28 into the groove 29. The outer force acting on the bracket 14 and the separating load generated by the rotational force at the tightening state of the bolt 30 are separately supplied to the welded portion and the fixed insertion portion, so that the decrease of the separation strength can be reduced to the minimum. Furthermore, since the welding is performed on the top end of the flange portion 27, the welded portion becomes a separated position from a sliding surface 21b of the roller 25 for the length of the flange portion 27 and the strain of the heat by the welding is not easily generated on the sliding surface and the roller 25 can slide smoothly.

The invention has thus been shown and described with reference to specific embodiments, however, it should be noted that the invention is in no way limited to the details of the illustrated structures. Changes and modifications may be made without departing from the scope of the appended claims.

We claim:

1. A seat slide assembly, attached to a base surface, comprising:
   an upper rail portion for fixedly attaching to the seat;
   a lower rail portion including a generally horizontal base having upper and lower sides and right and left edges, a pair of spaced flanges upwardly projecting from the upper side at the respective right and left edges, slidably engaging the upper rail portion, and a pair of spaced flanges downwardly depending from the lower side at the respective right and left edges;
   a nut member having top and bottom surfaces and an outer peripheral surface, the top surface of said nut member fixed to the lower side of the base of said lower rail portion, and the outer peripheral surface encircled by a groove;
   a tongue portion projecting inwardly from each of said downwardly depending flanges of said lower rail portion, said tongue portions inserted in the outer peripheral surface of the nut member, including means for engaging said groove; and
   a bolt member threadably engaging said nut member for attaching the assembly to the base surface.

2. The seat slide assembly of claim 1, wherein the engaging means of said tongue portion and the groove of said nut member each include opposing horizontal surfaces.

3. The seat slide assembly of claim 1, wherein the engaging means of said tongue portion and the groove of said nut member each include opposing tapered surfaces.

4. The seat slide assembly of claim 1, wherein the engaging means of said tongue portion and the groove of said nut member each include opposing serrated surfaces.

5. The seat slide assembly of claim 1, wherein the engaging means of said tongue portion and the groove of said nut member each include opposing inclined surfaces.

6. The seat slide assembly of claim 1, wherein the bottom surface of said nut member extends laterally outward beneath the downwardly depending flanges of said lower rail portion.

* * * * *